US008472095B2

(12) United States Patent
McCrodden et al.

(10) Patent No.: US 8,472,095 B2
(45) Date of Patent: Jun. 25, 2013

(54) TRUE THREE DIMENSIONAL IMAGERY AND USE THEREOF

(75) Inventors: Keith R. McCrodden, Holyoke, MA (US); John H. Hazen, South Hadley, MA (US)

(73) Assignee: Hazen Paper Company, Holyoke, MA (US)

( * ) Notice: Subject to any disclaimer, the term of this patent is extended or adjusted under 35 U.S.C. 154(b) by 163 days.

(21) Appl. No.: 12/829,621

(22) Filed: Jul. 2, 2010

(65) Prior Publication Data

US 2011/0002021 A1    Jan. 6, 2011

Related U.S. Application Data

(60) Provisional application No. 61/222,688, filed on Jul. 2, 2009.

(51) Int. Cl.
*G03H 1/02* (2006.01)
*G03H 1/10* (2006.01)

(52) U.S. Cl.
USPC .................................. 359/28; 359/10; 283/86

(58) Field of Classification Search
USPC .......................................................... 359/28
See application file for complete search history.

(56) References Cited

U.S. PATENT DOCUMENTS

| 5,548,419 A | * | 8/1996 | Adrian et al. | 359/24 |
| 5,838,466 A | * | 11/1998 | Mallik | 359/2 |
| 2007/0236764 A1 | * | 10/2007 | Ihama | 359/3 |

* cited by examiner

*Primary Examiner* — Jade R Chwasz
(74) *Attorney, Agent, or Firm* — McCormick, Paulding & Huber LLP

(57) ABSTRACT

A method for producing true three dimension imagery includes positioning an object to be imaged and directing imaging laser beams to impinge upon the object. Splitting the imaging laser beams after the imaging laser beams have impinged upon the object is then accomplished, while redirecting the split imaging beams to a recording substrate.

2 Claims, 1 Drawing Sheet

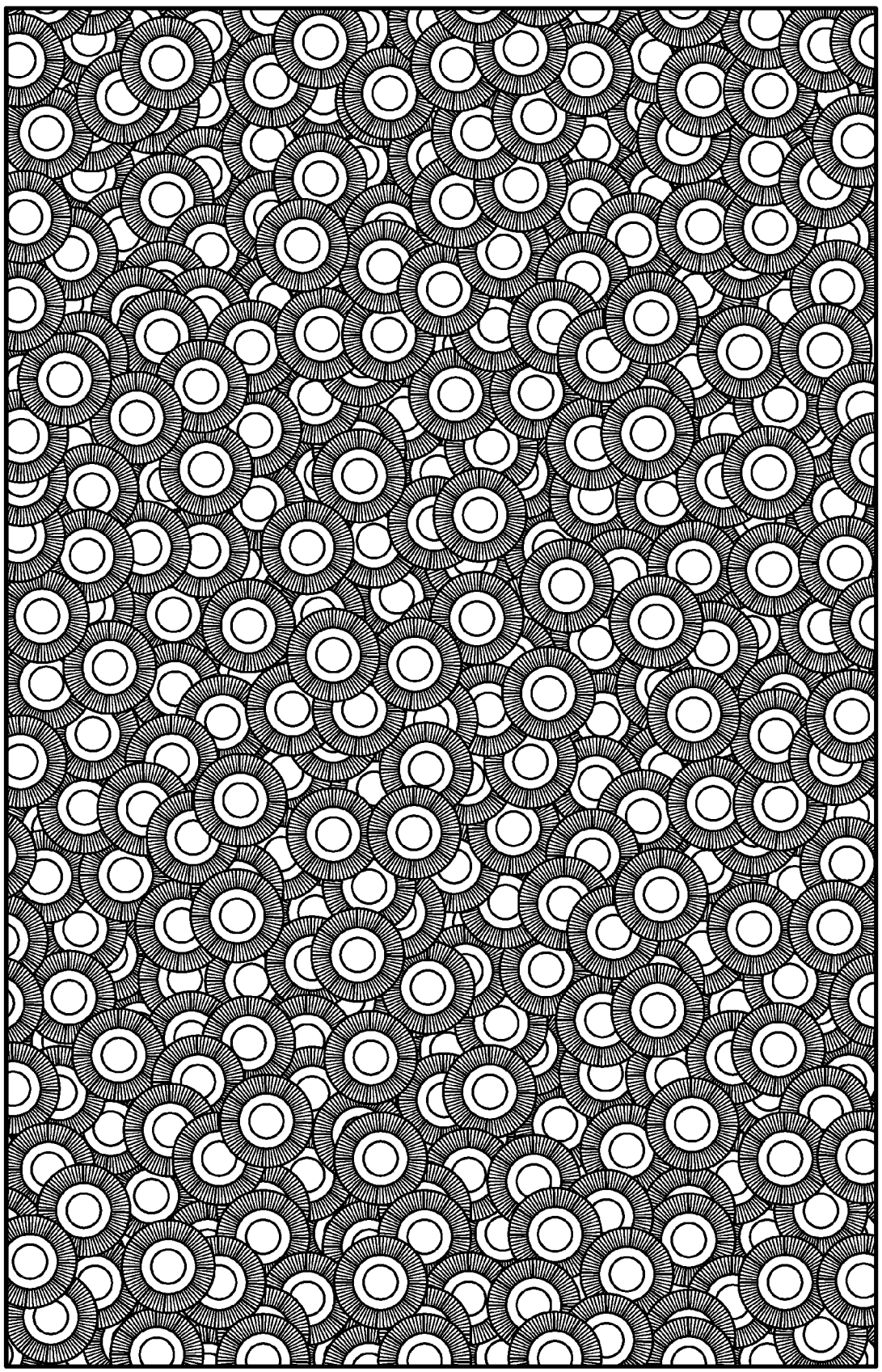

TRUE THREE DIMENSIONAL IMAGERY AND USE THEREOF

FIELD OF THE INVENTION

This invention relates in general to a method and apparatus for true three dimensional imagery, and deals more particularly with a method and apparatus for true three dimensional imagery that utilizes the actual object that is to be imaged when forming the three dimensional image.

BACKGROUND OF THE INVENTION

Pseudo three dimensional imaging has been employed for some time in order to provide fanciful or ornamental images on various substrates.

In particular, a process of dot-matrix holography has generally been employed to create pseudo three dimensional images. This process does not utilize the actual object to be imaged itself, but instead relies upon a piece-wise formation of the image, whereby each 'dot' is created individually by causing two laser beams to interfere with each other to generate interference fringes which are recorded. Typically, this is achieved by causing the two beams to impinge on respective portions of a focusing lens which then focuses the beams towards each other into a focusing region where the record medium is located.

While such known processes provide a reasonable ornamental result for many applications, the visual depth of the resultant images are only marginal.

In recent years, it has been observed that the sales of instant scratch-off lottery tickets have been positively impacted by the printing of these tickets on specialty substrates that provide enhanced visibility (ie. dot-matrix holographic board). Due to its highly reflective nature, constantly changing' colors, along with the virtual appearance of movement, instant games printed on dot-matrix holographic board have been found to significantly increase the sales of the resultant scratch-off games versus games printed on conventional plain board.

These sales increases have been attributed to the enhanced visibility and heightened interest of the instant games using the dot-matrix holographic board, which has allowed these games to break out of the "clutter" of the retail environment and capture consumers' attention.

Although "dot-matrix" holography provides a reasonable ornamental result, the visual depth, and realism of the imagery is only marginal.

With the forgoing problems and concerns in mind, it is the general object of the present invention to provide a method and apparatus for true three dimensional imaging that substantially increases the visual depth of the image, while also increasing the security of the image itself.

SUMMARY OF THE INVENTION

It is an object of the present invention to provide a method and apparatus for true three dimensional imagery.

It is another object of the present invention to propose a method and apparatus for enhancing the sales of instant "scratch-off" lottery tickets using true three dimensional holographic images.

These true 3D images can be created using actual sized holographic imagery of physical objects (e.g., coins, dice, poker chips) and be reproduced to provide the background material used in the process of overprinting instant "scratch-off" lottery tickets.

BRIEF DESCRIPTION OF THE DRAWINGS

FIG. 1 illustrates an improved true three dimensional image, the image acting as the base for a lottery ticket, in accordance with one embodiment of the present invention.

DETAILED DESCRIPTION OF THE PREFERRED EMBODIMENT

The method of the present invention involves utilizing the actual object to be imaged. In doing so, lasers are directed at, and impinge upon, the actual object and are subsequently split and directed to an image recording substrate.

With this method, an image may be created that has the exact size and shape as does the original object itself. The image also has a greater visual depth than known dot-matrix imagery.

In addition to the greater depth of the visual field, the true three dimensional imagery method of the present invention increases the security of the image recording substrate. That is, images resulting from the method of the present invention cannot be precisely replicated with commercially available photo copiers.

Still further, the greater visual depth of the resultant image makes for a far more appealing and enticing image as a whole, Indeed, as illustrated in the poker chip imagery of FIG. 1, one preferred use for the true three dimensional imagery of the present invention is as the backing for lottery tickets, scratch-off tickets and the like. As will be appreciated, the buying of lottery and scratch-off tickets is often impulse-based, and thus the ornamental aspect of the tickets themselves is a significant consideration.

Known pseudo three dimensional imagery on lottery tickets merely employ cold foil stamped images, which cannot compete with the visual depth of field or increased security capabilities of the method of the present invention.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A method for producing a true, three dimensional holographic image on a lottery card, comprising:
   positioning an object to be imaged;
   directing imaging laser beams to impinge upon said object; and
   splitting said imaging laser beams only after said imaging laser beams have impinged upon said object; and
   redirecting said split imaging beams to a recording substrate as a portion of said lottery card such that said that split imaging beams simultaneously impinge the same point on said recording substrate.

2. The method according to claim 1, wherein:
   said holographic image produced is the exact same size and shape as said object.

* * * * *